US012748778B1

(12) United States Patent
Emord et al.

(10) Patent No.: US 12,748,778 B1
(45) Date of Patent: Sep. 29, 2026

(54) DATABASE SHARDING BASED ON A UNIVERSALLY UNIQUE IDENTIFIER (UUID)

(71) Applicant: Peregrine Technologies, Inc., San Francisco, CA (US)

(72) Inventors: Jonathan Robert Emord, Boston, MA (US); Wyatt Wade Berlinic, Cambridge, MA (US); Benjamin Daniel Rudolph, San Francisco, CA (US)

(73) Assignee: Peregrine Technologies, Inc., San Francisco, CA (US)

( * ) Notice: Subject to any disclaimer, the term of this patent is extended or adjusted under 35 U.S.C. 154(b) by 0 days.

(21) Appl. No.: 19/302,817

(22) Filed: Aug. 18, 2025

(51) Int. Cl.
*G06F 16/28* (2019.01)
*G06F 16/242* (2019.01)
*G06F 16/2457* (2019.01)
*G06F 16/27* (2019.01)

(52) U.S. Cl.
CPC ........ *G06F 16/282* (2019.01); *G06F 16/2423* (2019.01); *G06F 16/24573* (2019.01); *G06F 16/278* (2019.01)

(58) Field of Classification Search
CPC ............... G06F 16/282; G06F 16/2423; G06F 16/24573; G06F 16/278
See application file for complete search history.

(56) References Cited

U.S. PATENT DOCUMENTS

| | | | | |
|---|---|---|---|---|
| 10,831,725 | B2 * | 11/2020 | Shimanovsky | H04W 64/00 |
| 12,437,113 | B1 * | 10/2025 | Dahme | G06N 20/00 |
| 2018/0205790 | A1 * | 7/2018 | Mercian | H04L 67/1097 |
| 2019/0340385 | A1 * | 11/2019 | Alsina | G06F 21/6245 |
| 2023/0020330 | A1 * | 1/2023 | Schwerin | G06F 16/256 |
| 2025/0148098 | A1 * | 5/2025 | DeBellis | G06F 21/629 |
| 2025/0286737 | A1 * | 9/2025 | Bronk | H04L 9/3247 |
| 2025/0293884 | A1 * | 9/2025 | Gilchrist | G06F 3/0655 |

OTHER PUBLICATIONS

Cattell et al. "Scalable SQL and NoSQL Data Stores", https://cgi.di.uoa.gr/~ad/M149/Cattell.pdf, 2011 (Year: 2011).*

* cited by examiner

*Primary Examiner* — Matthew J Ellis
(74) *Attorney, Agent, or Firm* — Van Pelt, Yi & James LLP

(57) ABSTRACT

In various embodiments, a process for database sharding based on a universally unique identifier (UUID) includes receiving a database record having a unique identifier comprising a first bit-field encoding an organization identifier and a second bit-field encoding a secondary identifier, wherein the unique identifier is utilized to uniquely identify the database record among other database records. The process includes extracting, for database sharding, the first bit-field and the second bit-field from the unique identifier; identifying a corresponding database shard for the database record based on the first bit-field and the second bit-field and a hierarchical relationship between the first bit-field encoding the organization identifier and the second bit-field encoding the secondary identifier; and routing the database record to the corresponding database shard for database storage balancing.

19 Claims, 5 Drawing Sheets

DATABASE SHARDING BASED ON A UNIVERSALLY UNIQUE IDENTIFIER (UUID)

BACKGROUND OF THE INVENTION

Data may be aggregated, disaggregated, and stored in a variety of ways in a database. As the volume of data increases and data analytics improves with advancing technology, the efficiency of computing may be affected by how or where data is stored. For example, particular organizations may wish to store their data independently from other organizations or a third party platform may wish to organize data based on the organizations with which the data is associated. Database sharding refers to dividing a database into smaller pieces called "shards" that store a subset of the data. Shards may be stored in separate servers or nodes. Sharding data may improve performance by reducing latency because queries run on smaller sets of data, improve scalability, and make larger datasets more manageable. However, it is challenging to shard data efficiently or effectively. Thus, there is a need for improved database sharding.

BRIEF DESCRIPTION OF THE DRAWINGS

Various embodiments of the invention are disclosed in the following detailed description and the accompanying drawings.

DETAILED DESCRIPTION

Figure 1:
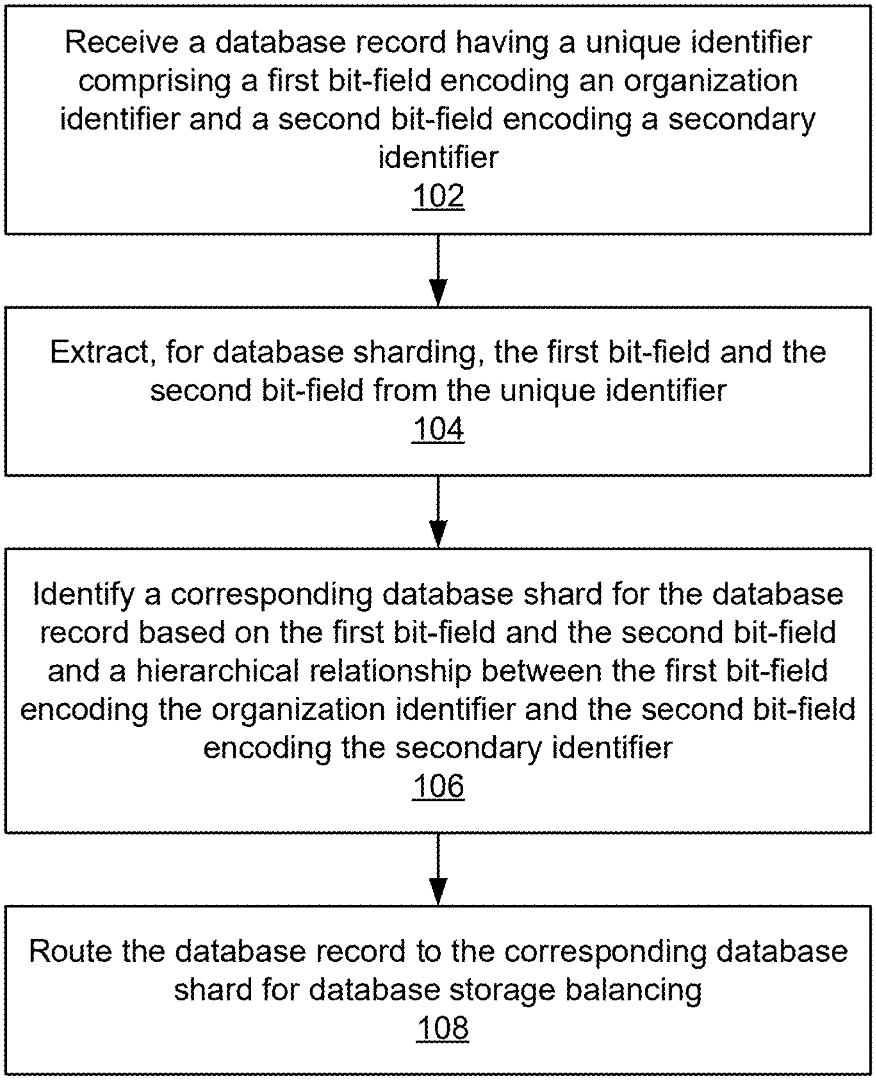
FIG. 1 is a flow diagram illustrating an embodiment of a process for database sharding based on a universally unique identifier (UUID).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Large volumes of data may be split and stored in multiple databases. The data may be organized as records and each record has a universally unique identifier (UUID). The records are stored in physical storage such as databases in various locations. A "record" or "database record" refers to an entity representation, which is an abstraction of a real-world object for a customer/organization to manage within a system or database. Thus, a record is sometimes referred to as an "entity record." The record may be an individual, unified entity representation of data that is harmonized and integrated across multiple sources. Data about a particular person, place, or event can be consolidated into a single "record." This links information logically and uniquely to facilitate better (e.g., easier, more efficient, faster) searches, analyses, and decision-making while reducing technical debt due to duplicate or fragmented data.

An entity record can represent real-world entities such as persons or real-world objects. An identified group of related entity records corresponds to a common underlying entity such as a particular person or real-world object. An entity record merges elements from the individual records of the group without modifying the original individual records. Optionally, an entity record may include enriched data. For example, law enforcement data from various records management systems or computer-aided dispatch systems may be consolidated. The merged records provide a more streamlined and insightful access to entity data. Moreover, by retaining the original individual entity records in addition to the newly created merged records, a user can easily switch between optionally enabling and disabling merged records and/or original individual entity records to maintain data source traceability and compatibility with previously existing references and applications that still rely on the original individual entity records. Each record may have an assigned or associated UUID that allows the record to be distinctly referenced across systems. The UUID may serve as a primary key for identifying and unifying records across disparate data sources.

Conventional techniques may aggregate or disaggregate data based on who a customer is but typically do not use industry standard identifiers to shard data. The disclosed techniques use one or more identifiers and associated rules to shard data. In various embodiments, a UUID includes encoded information that is used to shard data into various shards or databases. Within each database there may be various tables or data types. Upon determination of the data type, the data can be sorted into an appropriate table. Thus, a UUID is used to determine which database or shard that data belongs to as well as a table in which to sort the data.

FIG. 1 is a flow diagram illustrating an embodiment of a process for database sharding based on a universally unique identifier (UUID). This process may be implemented on database sharding engine 222 further described herein with respect to FIG. 2.

In the example shown, the process begins by receiving a database record having a unique identifier comprising a first bit-field encoding an organization identifier and a second bit-field encoding a secondary identifier (102). The unique identifier is utilized to uniquely identify the database record among other database records. As described herein, the database record refers to an entity representation, which is an abstraction of a real-world object for a customer/organization to manage within a system or database. Each database record may be uniquely identified using a unique identifier such as a UUID.

Figure 3A:
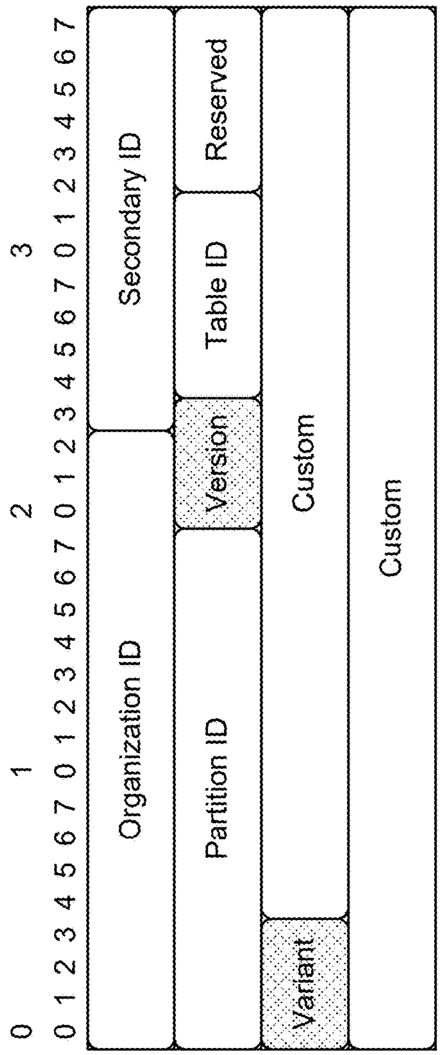
FIG. 3A illustrates an example of a universally unique identifier obtained in some embodiments (UUID).
Figure 3B:
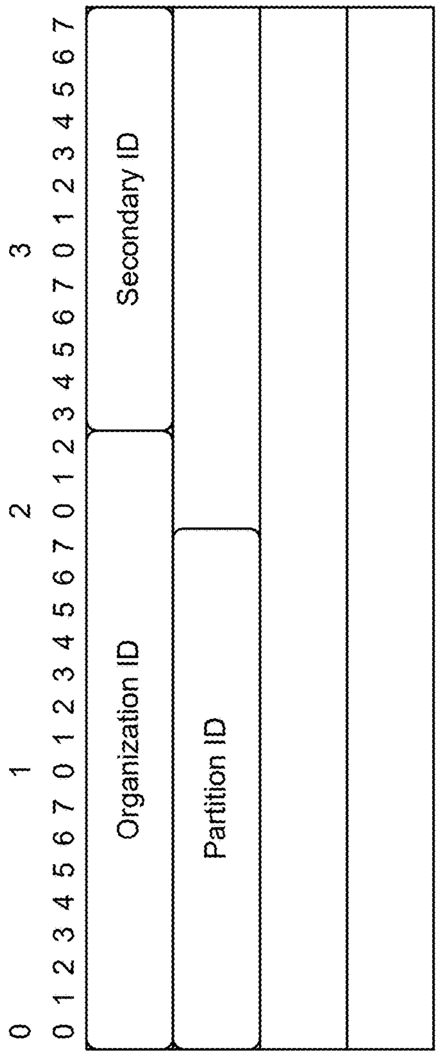
FIG. 3B illustrates an example of a universally unique identifier obtained in some embodiments (UUID).

In various embodiments, the unique identifier includes a universally unique identifier (UUID) version 8. The unique identifier may include one or more bit-fields encoding identifiers that are used for identifying a corresponding database for the database record, or more generally, for sharding data. Examples of bit-fields are shown in FIGS. 3A and 3B.

The process extracts, for database sharding, the first bit-field and the second bit-field from the unique identifier (104). Using the example of UUID v8, which is 128 bits long, the bit fields are extracted by treating the UUID as a 128-bit binary value and applying bitwise operations such as shifts and masks to isolate the first bit-field and the second bit-field. As further described herein, the extracted bit-fields may be used for sharding data.

The process identifies a corresponding database shard for the database record based on the first bit-field and the second bit-field and a hierarchical relationship between the first bit-field encoding the organization identifier and the second bit-field encoding the secondary identifier (106). The first and second bit-fields are used for database sharding by guiding the identification of an appropriate, corresponding database shard. In various embodiments, a first level of sharding is performed based on the value of the first bit-field and a second level of sharding is performed based on the value of the second bit-field. In various embodiments, the organization identifier identifies a partition (e.g., used for partitioning/sharding) and the secondary identifier encodes additional information. The secondary identifier may improve data locality and improve the performance of index scans. Sometimes, performing the first level of sharding alone is sufficient and the second bit-field is not used, as further described with respect to FIG. 4.

In various embodiments, the hierarchical relationship between the first bit-field and the second bit-field includes the first bit-field preceding the second bit-field in the unique identifier. An ordering of the first bit-field preceding the second bit-field improves performance of queries compared with a different ordering of the first bit-field and the second bit-field. For example, when the first and second bit-fields are in a particular order, the ordering of indices and layout on disk is improved. Consequently, the performance of queries in object-relational databases is improved.

In various embodiments, a corresponding database shard is identified for the database record based on the first bit-field and the second bit-field without additional information. This is unlike conventional database sharding techniques that may involve hash functions. The disclosed techniques enables queries to be efficiently routed to a correct database instance with only a primary key because the primary key is the shard key, so additional information does not need to be passed around.

The process routes the database record to the corresponding database shard for database storage balancing (108). Database storage balancing refers to distributing data and/or workload in a balanced manner across various storage resources so that particular servers, disks, or nodes are not overloaded while others are underutilized. Data may be initially stored in a balanced manner and may also be redistributed across nodes or partitions of the distributed system so that storage and computational workload are balanced. As a database system grows to accommodate new, removed, or altered data, rebalancing helps to ensure efficient access and storage utilization over time.

In various embodiments, the process determines an initial data schema for distributing database records among a plurality of databases. The database storage balancing is based on the initial data schema. A schema may include an implementation of a namespace to organize and separate database objects such as tables, views, indices, etc. to facilitate database management by improving structure and security. An initial schema that specifies where to store data may be determined in a variety of ways. The initial schema may be defined manually such as based on the UUID. Alternatively, the initial schema may be automated. An (initial data) schema may organize data based on one or more of the following, without limitation:

geographical location,
data sharing agreements,
a volume of data to be stored, and/or
user preference.

Rebalancing or an update to the database storage may be performed from time to time or in response to various triggers. It may be beneficial to balance or rebalance the storing of records across the various databases. For example, if there is a customer that has more records than another customer, storing all of the records for a particular customer in the same location may cause an imbalance or inefficient use of available storage. Like the definition of the initial schema, rebalancing may be performed manually or automatically.

In various embodiments, the process updates the database storage balancing including by performing logical replication to determine a new distribution of data among a plurality of databases. Logical replication, such as Postgres logical replication, causes a customer/organization's tables to be replicated to another database, or, more generally, causes changes in a logical (e.g., row/data) level to be replicated to another location.

Figure 4:
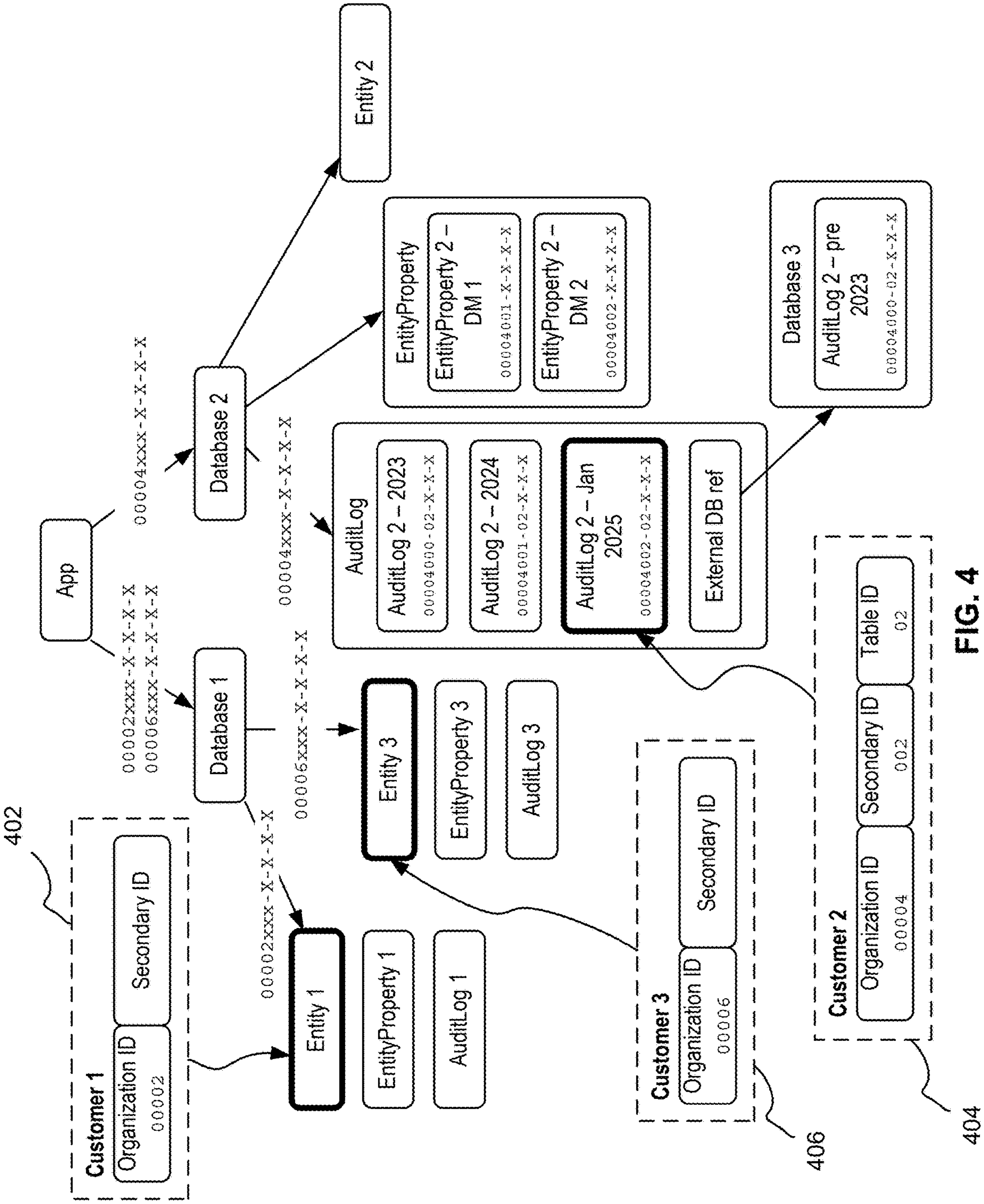
FIG. 4 illustrates an example of database sharding based on a universally unique identifier (UUID).

An example of the process of FIG. 1 is further described with respect to FIG. 4.

The following figure shows an example of a system that may be configured to perform the process of FIG. 1.

Figure 2:
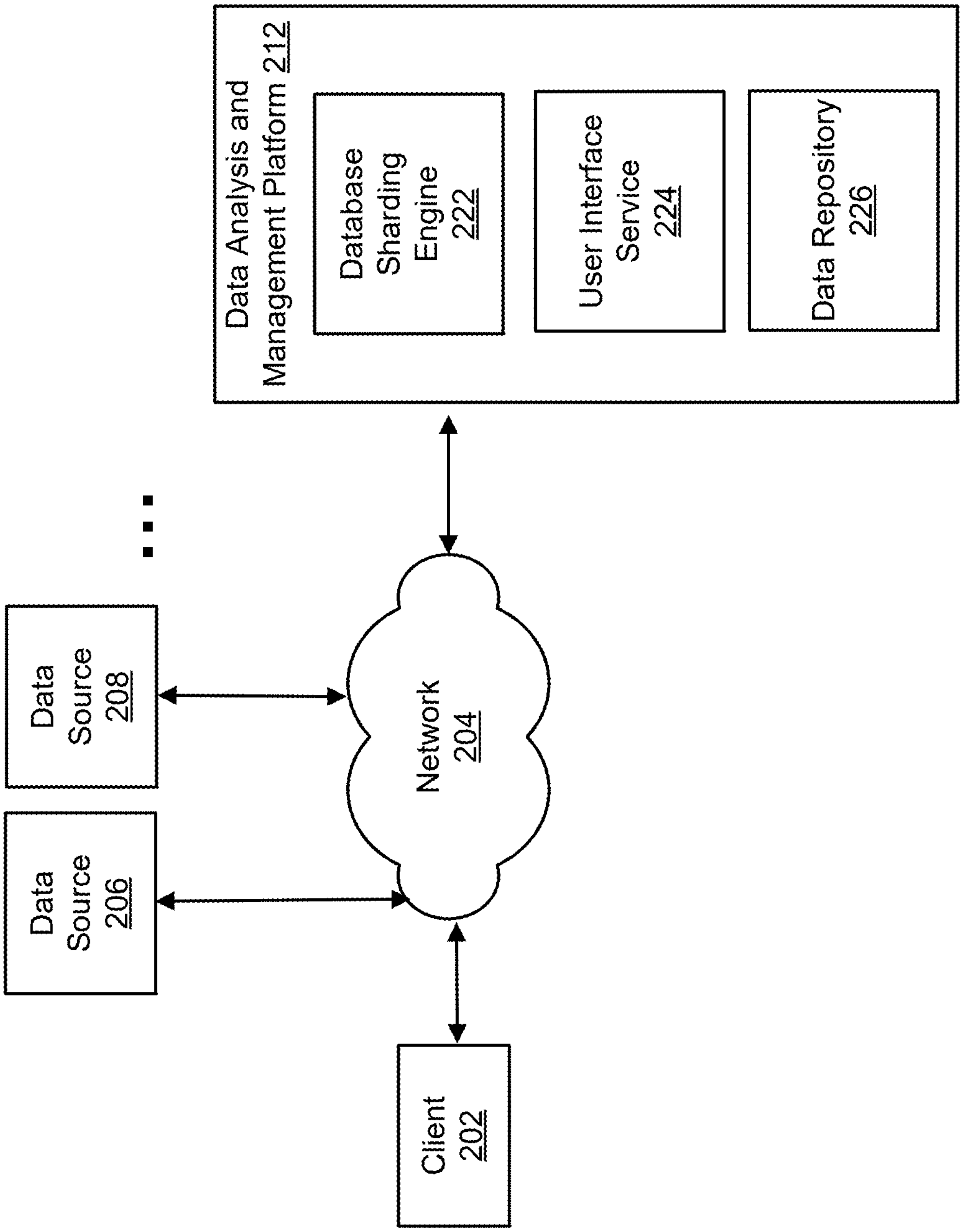
FIG. 2 is a block diagram illustrating an embodiment of a system for database sharding based on a universally unique identifier (UUID).

FIG. 2 is a block diagram illustrating an embodiment of a system for database sharding based on a universally unique identifier (UUID). In the example network environment shown, client 202, data source 206, data source 208, and data analysis and management platform 212 are connected via network 204. Network 204 can be a public or private network. In some embodiments, network 204 is a public network such as the internet. Examples of network 204 include one or more of the following: a direct or indirect physical communication connection, internet, intranet, Local Area Network, Wide Area Network, Storage Area Network, and any other form of connecting two or more systems, components, or storage devices together. In various embodiments, data analysis and management platform 212 offers a user interface service 224 that implements database sharding engine 222 as well as other data-related services. Data analysis and management platform 212 also includes data repository 226, which stores data that has been sharded according to the database sharding engine and user interface service 224. Data analysis and management platform 212 is communicatively connected to client 202 and offers its data related services to clients such as client 202. For example, client 202 utilizes data analysis and management platform 212 to visualize, analyze, and evaluate the data stored in data repository 226.

In some embodiments, client 202 is an example client for accessing data-related services offered by data analysis and management platform 212. For example, client 202 can be a network device such as a desktop computer, a laptop, a tablet, or another network computing device. As a network device, client 202 can access services offered by data analysis and management platform 212 including the ability to visualize and manipulate data from data repository 226 using user interface service 224. The data from data repository 226 may include data processed by database sharding engine 222. For example, database sharding engine 222 may be configured to perform the process of FIG. 1 to shard data from the data sources 206 and 208.

In some embodiments, data source 206 and data source 208 provide entity records to platform 212. An organization may want to collate, manage, and analyze entity records from various existing databases and records management systems, and data analysis and management platform 212 collects the record data from these various data sources for a user and/or an organization of client 202. For example, data source 206 and data source 208 include various different record management systems that provide entity record data to platform 212 via network 204 for analysis and management. Data source 206 and data source 208 may provide updated entity records periodically and/or dynamically. The received entity records are cached and/or stored by platform 212 in repository 226. In various embodiments, data source 206 and data source 208 include one or more storage systems (e.g., a database, file system, record management system, or cloud-based storage system accessed via an Application Programming Interface). The data from data source 206 and/or data source 208 can be formatted as text, binary, documents, files, spreadsheets, images, databases, or any other methods of formatting data. Although two data sources are shown in the example of FIG. 1, any number of data sources may be utilized in various embodiments.

In some embodiments, data analysis and management platform 212 is a platform that offers multiple data analysis and management services accessible through user interface service 224. The platform may be implemented through a website or software application. In the example shown, data analysis and management platform 212 includes database sharding engine 222, user interface service 224, and data repository 226. In some embodiments, database sharding engine 222 is communicatively connected to data repository 226, can perform entity resolution on data from data repository 226, and stores the output of the entity resolution in data repository 226. For example, database sharding engine 222 shards data and routes database records to appropriate tables/shards in data repository 226. In some embodiments, user interface service 224 allows client 202 to manage and analyze data stored in data repository 226. For example, client 202 can visualize, edit, and group merged entity records and individual entity records in data repository 226 through user interface service 224.

In some embodiments, the components shown in FIG. 1 may exist in various combinations of hardware machines. Although single instances of some components have been shown to simplify the diagram, additional instances of any of the components shown in FIG. 1 may exist. For example, data analysis and management platform 212 can include one or more servers including one or more servers for database sharding engine 222, user interface service 224, and data repository 226. The included servers can include distributed servers including web servers, application servers, and database servers, among others. Although data analysis and management platform 212 includes database sharding engine 222, user interface service 224, and data repository 226, other services can be implemented and hosted by data analysis and management platform 212 as well. As shown in FIG. 1, client 202 is just one example of a potential client to data analysis and management platform 212. In some embodiments, components not shown in FIG. 1 may also exist.

The following figures show examples of a UUID that may be used to shard data.

FIG. 3A illustrates an example of a universally unique identifier obtained in some embodiments (UUID). The examples described herein use UUID version 8 (UUID v8), which is a standard format specified by RFC 9562 of IETF (Internet Engineering Task Force). UUID v8 supports the creation of custom UUIDs in an RFC-compatible way. However, the use of UUID v8 is merely exemplary and not intended to be limiting, as the disclosed techniques may be applied to other UUID formats.

A UUID conforming to UUID v8 is 128 bits (e.g., 32 hexadecimal characters) in length. The number of bits is identified by the numbering at the top, showing 4 groupings of 8 bits each (group 1 being numbered 0, group 2 being numbered 1, and so on). UUID v8 reserves two fields and allows the remainder to be customized. As represented by the greyed-out boxes, bits 48 through 51 will be replaced with the UUID version field, and bits 64 and 65 will be replaced with the UUID variant.

In various embodiments, a UUID is segmented into various fields including a first field corresponding to an organization identifier and a second field corresponding to a customer such as a data model identifier or timestamp. In this example, the first bit-field includes 19 bits. Here the first bit-field encodes an organization identifier. The organization identifier may include a specified prefix corresponding to a specific organization.

In this example, the second bit-field includes 29 bits. Here the second bit-field encodes a secondary identifier that may be used to identify a partition to which data belongs/is to be stored. The secondary identifier may include at least one of: a timestamp or a data model identifier associated with an entity. The selection of a data model identifier, a timestamp, or other may be based on use case to maximize data locality for the most common use case(s). Generally, a data model identifier may be attractive for referencing a data model in a model definition. A timestamp may be attractive for models that are generally append-only and do not have a data model.

For example, a timestamp with minute precision may be used or with a different level of precision may be used depending on volume or precision desired. A data model may be specific to an organization. For example, an organization may store various entities such as a person, vehicle, incident, or the like. A data model identifier identifies a data model for an entity. An entity table may store entity records, where a column labels the record in each row with its data model. An entity refers to a top-level hierarchy having individual person, vehicle, or incident objects. Instances (records) of persons, vehicles, or incidents may be instantiated.

The UUID may include other fields that are not necessarily used for scaling. For example, a Table ID (sometimes referred to as a Version ID) of 6 bits may be included in the UUID. A Custom field may be included to provide fully deterministic UUIDs. For example, the Custom field may be used when there is a digest of data that is being stored and not expected to change over time. Collisions may occur when a single data model has many entities. To prevent collisions, the Custom field may include some random data that will enable otherwise identical UUIDs to be distinguished from one another.

FIG. 3B illustrates an example of a universally unique identifier obtained in some embodiments (UUID). Each of the components are like their counterparts in FIG. 3A unless otherwise described. In various embodiments, a UUID that includes an organization identifier and secondary identifier without the additional fields shown in FIG. 3A can be used for database sharding.

FIG. 4 illustrates an example of database sharding based on a universally unique identifier (UUID). In this example, the sharding of data associated with each of UUIDs 402, 404, and 406 according to the process of FIG. 1 will be described.

The application (box labeled "App) includes two databases, Database 1 and Database 2. Database 1 includes tables associated with Entity 1 and Entity 3. Database 2 includes an AuditLog table, EntityProperty table, and Entity 2 table.

A UUID may be used to perform database sharding. For example, UUID 402 is associated with a first customer (Customer 1) because it has a specific organization ID "00002." All UUIDs having this prefix or first bit-field are associated with the same organization. Referring briefly to 106, identifying the corresponding database shard for the database record may include sharding on the organization identifier. Referring again to the example of UUID 402, sharding on Organization ID "00002" causes the database shard for Entity 1 to be identified, as represented by the thick outline in the corresponding box. For the example of UUID 406, sharding on Organization ID "00006" causes the database shard for Entity 3 to be identified. In this example, Customers 1 and 3 may be relatively small customers that share Database 1. The sharding is also represented by the UUIDs superimposed on the arrows. For example, any UUID with the first bit-field "00002" and "00006" get routed to Database 1. From there, any UUID with the first bit-field "00002" gets routed to Entity 1 while any UUID with the first bit-field "00006" gets routed to Entity 3.

The example of UUID 404 is associated with Customer 2. Customer 2 may be a larger customer or one that prefers to store its data in a separate database from other customers. Referring briefly to 106, identifying the corresponding database shard for the database record may include sharding on the secondary identifier. Sharding on the secondary identifier causes a database record to be stored in a particular database or a particular table of a database. Sharding on the partitional identifier may cause the data to be placed in a specific database or in different tables of a specific database depending on an organization's characteristics or preferences. Referring to UUID 404, the data gets sharded into AuditLog 2—January 2025 because the Organization ID (first bit-field) is 00004, the Partition ID (second bit-field) is 002, and the Table ID (third bit-field) is 02. The Table ID (sometimes called a Version ID) value of 02 corresponds to the AuditLog table, so the data is not placed in the EntityProperty table.

In various embodiments, the secondary identifier includes a data model identifier and sharding on the data model identifier identifies the corresponding database shard for the database record to be a table associated with an entity property. The data model identifier may represent at least one of: a person or a vehicle, and an entity associated with the entity property represents an instance of an object.

The secondary identifier may include a timestamp and sharding on the timestamp identifies the corresponding database shard for the database record to be a table associated with an audit log. A timestamp may be helpful for optimizations for time series data. For example, an audit log accumulates overtime, so a timestamp would indicate that data should be placed in a database shard associated with an audit log table. In this example, an optimization is placing older data (pre 2023) in an external database because typically when an audit log is accessed, the more recent data is of greater interest.

Figure 5:
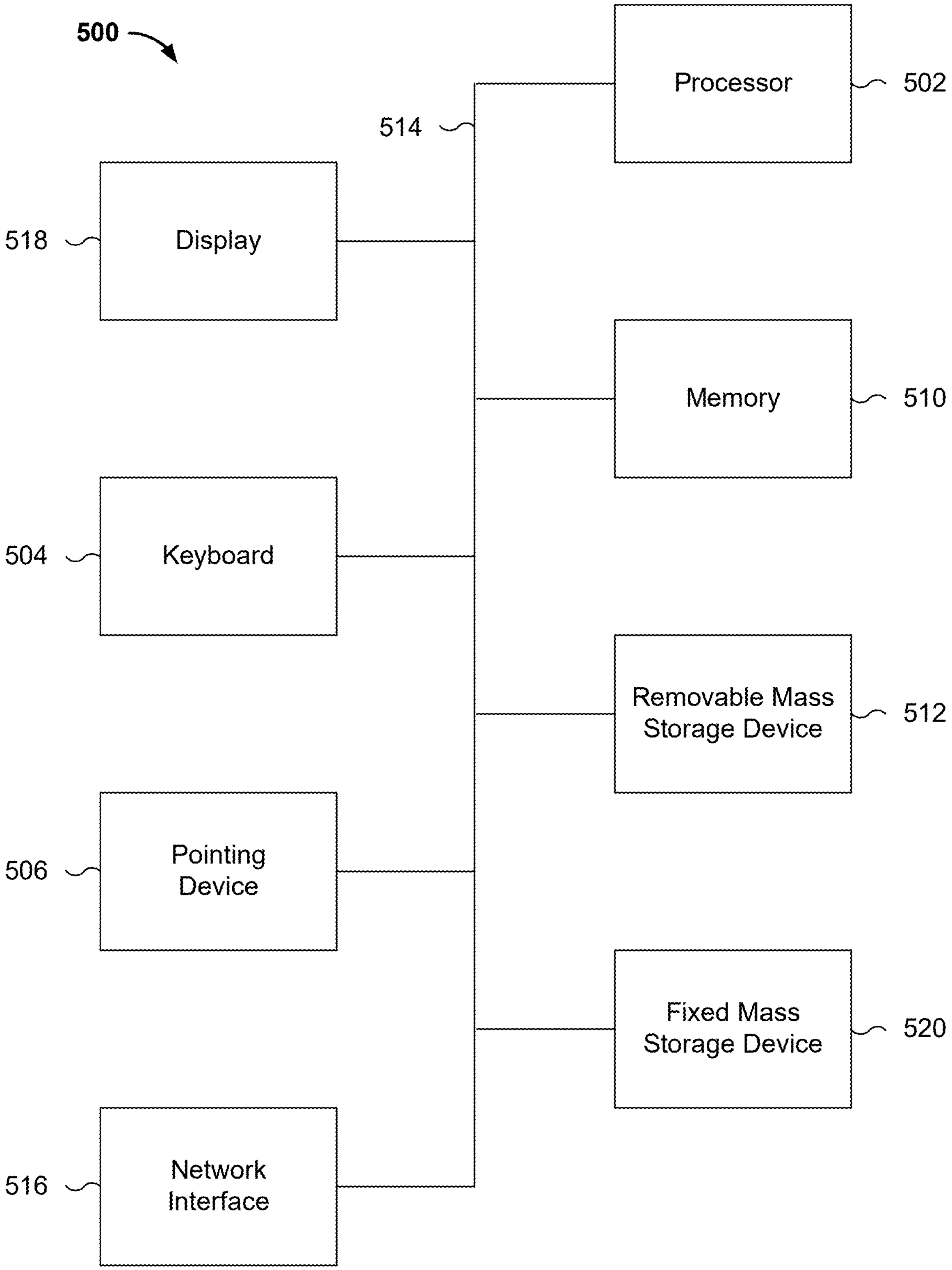
FIG. 5 is a functional diagram illustrating a programmed computer system for database sharding based on a universally unique identifier (UUID) in accordance with some embodiments.

FIG. 5 is a functional diagram illustrating a programmed computer system for database sharding based on a universally unique identifier (UUID) in accordance with some embodiments. As will be apparent, other computer system architectures and configurations can be used to perform the described database sharding technique. Computer system 500, which includes various subsystems as described below, includes at least one microprocessor subsystem (also referred to as a processor or a central processing unit (CPU) 502). For example, processor 502 can be implemented by a single-chip processor or by multiple processors. In some embodiments, processor 502 is a general purpose digital processor that controls the operation of the computer system 500. In some embodiments, processor 502 also includes one or more coprocessors or special purpose processors (e.g., a graphics processor, a network processor, etc.). Using instructions retrieved from memory 510, processor 502 controls the reception and manipulation of input data received on an input device (e.g., pointing device 506, I/O device interface 504), and the output and display of data on output devices (e.g., display 518).

Processor 502 is coupled bi-directionally with memory 510, which can include, for example, one or more random access memories (RAM) and/or one or more read-only memories (ROM). As is well known in the art, memory 510 can be used as a general storage area, a temporary (e.g., scratch pad) memory, and/or a cache memory. Memory 510 can also be used to store input data and processed data, as well as to store programming instructions and data, in the form of data objects and text objects, in addition to other data and instructions for processes operating on processor 502. Also as is well known in the art, memory 510 typically includes basic operating instructions, program code, data, and objects used by the processor 502 to perform its functions (e.g., programmed instructions). For example, memory 510 can include any suitable computer readable storage media described below, depending on whether, for example, data access needs to be bi-directional or uni-directional. For example, processor 502 can also directly and very rapidly retrieve and store frequently needed data in a cache memory included in memory 510.

A removable mass storage device 512 provides additional data storage capacity for the computer system 500, and is optionally coupled either bi-directionally (read/write) or uni-directionally (read only) to processor 502. A fixed mass storage 520 can also, for example, provide additional data storage capacity. For example, storage devices 512 and/or 520 can include computer readable media such as magnetic tape, flash memory, PC-CARDS, portable mass storage devices such as hard drives (e.g., magnetic, optical, or solid state drives), holographic storage devices, and other storage devices. Mass storages 512 and/or 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can be used to provide access to other subsystems and devices as well. As shown, these can include a display 518, a network interface 516, an input/output (I/O) device interface 504, a pointing device 506, as well as other subsystems and devices. For example, I/O device interface 504 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 500. Multiple I/O device interfaces can be used in conjunction with computer system 500. The I/O device interface can include general and customized interfaces that allow the processor 502 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 516 allows processor 502 to be coupled to another computer, computer network, or telecommunications network using a network connection as shown. For example, through the network interface 516, the processor 502 can receive information (e.g., data objects or program instructions) from another network, or output information to another network in the course of performing method/process steps. Information, often represented as a sequence of instructions to be executed on a processor, can be received from and output to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 504 and display 518 share the touch sensitive screen component, which both detects user inputs and displays outputs to the user). In addition, bus 514 is illustrative of any interconnection scheme serving to link the subsystems. Other computer architectures having different configurations of subsystems can also be utilized.

The disclosed database sharding techniques have many benefits compared with conventional techniques. In one aspect, a universally unique identifier such as UUID v8 alone is sufficient to determine how to distribute data to a database. More specifically, a first bit-field such as an organization ID and a second bit-field such as a secondary identifier are used to perform database sharding without needing additional bit-field or information. This is beneficial in situations where the only available information is a UUID because complex objects do not need to be passed around. Instead, the UUID alone is adequate for encoding information and routing queries to the correct database. By contrast, conventional techniques may require additional information in order to perform database sharding. In another aspect, the disclosed UUIDs encode information such as the type of data, organization, data model, and/or timestamp. This encoded semantic information can be used to perform optimizations in contrast to UUIDs that encode only the shard. For example, a smaller portion of the tree may be traversed using the encoded semantic information compared with UUIDs that are typically assigned at random.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a database record having a unique identifier including a universally unique identifier (UUID) compatible with at least Version 8, wherein the unique identifier comprises a first bit-field encoding an organization identifier and a second bit-field encoding a secondary identifier, wherein the unique identifier is utilized to uniquely identify the database record among other database records;

extracting, for database sharding, the first bit-field and the second bit-field from the unique identifier;

identifying a corresponding database shard for the database record based on the first bit-field and the second bit-field and a hierarchical relationship between the first bit-field encoding the organization identifier and the second bit-field encoding the secondary identifier, wherein the unique identifier of the first bit-field and the second bit-field is a primary key that is a shard key such that the corresponding database shard is identified independent of a hash function; and routing the database record to the corresponding database shard for database storage balancing.

2. The method of claim 1, wherein the database record includes an entity representation of a real-world object associated with law enforcement.

3. The method of claim 1, wherein the first bit-field includes 19 bits.

4. The method of claim 1, wherein the second bit-field includes 29 bits.

5. The method of claim 1, wherein the organization identifier includes a specified prefix corresponding to a specific organization.

6. The method of claim 1, wherein the secondary identifier includes at least one of: a timestamp or a data model identifier associated with an entity.

7. The method of claim 1, wherein the hierarchical relationship between the first bit-field and the second bit-field includes the first bit-field preceding the second bit-field in the unique identifier.

8. The method of claim 1, wherein an ordering of the first bit-field preceding the second bit-field improves performance of queries compared with a different ordering of the first bit-field and the second bit-field.

9. The method of claim 1, further comprising determining an initial data schema for distributing database records among a plurality of databases, wherein:

the initial data schema is based at least in part on at least one of: geographical location, data sharing agreements, a volume of data to be stored, and a user preference; and the database storage balancing is based on the initial data schema.

10. The method of claim 1, further comprising updating the database storage balancing including by performing logical replication to determine a new distribution of data among a plurality of databases.

11. The method of claim 1, wherein identifying the corresponding database shard for the database record includes sharding on the organization identifier.

12. The method of claim 11, wherein identifying the corresponding database shard for the database record includes sharding on the secondary identifier.

13. The method of claim 12, wherein sharding on the secondary identifier causes the database record to be stored in a particular database.

14. The method of claim 12, wherein sharding on the secondary identifier causes the database record to be stored in a particular table of a database.

15. The method of claim 12, wherein the secondary identifier includes a data model identifier and sharding on the data model identifier identifies the corresponding database shard for the database record to be a table associated with an entity property.

16. The method of claim 15, wherein the data model identifier represents at least one of: a person or a vehicle and an entity associated with the entity property represents an instance of an object.

17. The method of claim 12, wherein the secondary identifier includes a timestamp and sharding on the timestamp identifies the corresponding database shard for the database record to be a table associated with an audit log.

18. A system, comprising:

a processor configured to:

receive a database record having a unique identifier including a universally unique identifier (UUID) compatible with at least Version 8, wherein the unique identifier comprises a first bit-field encoding an organization identifier and a second bit-field encoding a secondary identifier, wherein the unique identifier is utilized to uniquely identify the database record among other database records;

extract, for database sharding, the first bit-field and the second bit-field from the unique identifier;

identify a corresponding database shard for the database record based on the first bit-field and the second bit-field and a hierarchical relationship between the first bit-field encoding the organization identifier and the second bit-field encoding the secondary identifier, wherein the unique identifier of the first bit-field and the second bit-field is a primary key that is a shard key such that the corresponding database shard is identified independent of a hash function; and route the database record to the corresponding database shard for database storage balancing; and a memory coupled to the processor and configured to provide the processor with instructions.

19. A computer program product embodied in a non-transitory computer readable medium and comprising computer instructions for:

receiving a database record having a unique identifier including a universally unique identifier (UUID) compatible with at least Version 8, wherein the unique identifier comprises a first bit-field encoding an organization identifier and a second bit-field encoding a secondary identifier, wherein the unique identifier is utilized to uniquely identify the database record among other database records;

extracting, for database sharding, the first bit-field and the second bit-field from the unique identifier;

identifying a corresponding database shard for the database record based on the first bit-field and the second bit-field and a hierarchical relationship between the first bit-field encoding the organization identifier and the second bit-field encoding the secondary identifier, wherein the unique identifier of the first bit-field and the second bit-field is a primary key that is a shard key such that the corresponding database shard is identified independent of a hash function; and routing the database record to the corresponding database shard for database storage balancing.

* * * * *